(12) United States Patent
Lapis et al.

(10) Patent No.: US 12,240,462 B2
(45) Date of Patent: Mar. 4, 2025

(54) METHOD FOR CONTROLLING A MOTOR VEHICLE IN EMERGENCY STEERING MODE BY MEANS OF FRONT WHEEL BRAKE-BASED TORQUE VECTORING

(71) Applicants: thyssenkrupp Presta AG, Eschen (LI); thyssenkrupp AG, Essen (DE)

(72) Inventors: Leonard Lapis, Sennwald (CH); Carlo Mario Miano, Eschen (LI); Kristof Polmans, Tarrenz (AT)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 215 days.

(21) Appl. No.: 17/771,705

(22) PCT Filed: Oct. 21, 2020

(86) PCT No.: PCT/EP2020/079545
§ 371 (c)(1),
(2) Date: Apr. 25, 2022

(87) PCT Pub. No.: WO2021/083751
PCT Pub. Date: May 6, 2021

(65) Prior Publication Data
US 2023/0001929 A1 Jan. 5, 2023

(30) Foreign Application Priority Data
Oct. 28, 2019 (DE) ............ 10 2019 129 032.5

(51) Int. Cl.
*B60T 8/1755* (2006.01)
*B60W 10/08* (2006.01)
(Continued)

(52) U.S. Cl.
CPC ..... *B60W 30/18145* (2013.01); *B60T 8/1755* (2013.01); *B60T 8/17557* (2013.01);
(Continued)

(58) Field of Classification Search
CPC .............. B60T 8/1755; B60T 8/17557; B60T 8/17558; B60T 2260/02; B60W 10/188;
(Continued)

(56) References Cited

U.S. PATENT DOCUMENTS 6,076,626 A * 6/2000 Bohner ............... B62D 9/005
180/6.26
6,279,674 B1 8/2001 Lissel et al.
(Continued)

FOREIGN PATENT DOCUMENTS

CN 106467038 A 3/2017
CN 108025714 A 5/2018
(Continued)

OTHER PUBLICATIONS

English Translation of International Search Report Issued in PCT/EP2020/079545 dated Jan. 25, 2021.

*Primary Examiner* — Erick R Solis
(74) *Attorney, Agent, or Firm* — thyssenkrupp North America, LLC

(57) ABSTRACT

A method can be used to control a steer-by-wire steering system in an emergency steering mode. The method comprises checking a steering system for the presence of a fault state and upon detection of a fault implementing the emergency steering mode, which involves determining a setpoint position of a steering tie rod using a setpoint wheel steering angle, determining a front wheel to be braked and a brake pressure to attain the setpoint position with a control unit, transmitting the front wheel to be braked and the brake pressure to a brake system, braking the front wheel to be braked, and increasing a torque provided by a wheel drive to compensate for a loss of speed of the motor vehicle caused by the braking of the front wheel to be braked.

11 Claims, 2 Drawing Sheets

(51) Int. Cl.
| | |
|---|---|
| *B60W 10/18* | (2012.01) |
| *B60W 10/20* | (2006.01) |
| *B60W 30/10* | (2006.01) |
| *B60W 30/18* | (2012.01) |
| *B60W 60/00* | (2020.01) |
| *B62D 5/00* | (2006.01) |
| *B62D 5/04* | (2006.01) |
| *B62D 9/00* | (2006.01) |

(52) U.S. Cl.
CPC ............ *B60W 10/08* (2013.01); *B60W 10/18* (2013.01); *B60W 10/20* (2013.01); *B60W 30/10* (2013.01); *B60W 60/0016* (2020.02); *B62D 5/003* (2013.01); *B62D 5/0484* (2013.01); *B62D 9/005* (2013.01); *B60T 2220/03* (2013.01); *B60T 2260/02* (2013.01); *B60W 2510/18* (2013.01); *B60W 2510/20* (2013.01); *B60W 2530/201* (2020.02); *B60W 2540/18* (2013.01); *B60W 2710/083* (2013.01); *B60W 2710/18* (2013.01)

(58) Field of Classification Search
CPC ...... B60W 10/20; B60W 30/10; B60W 30/12; B60W 2510/20; B60W 2540/18; B62D 5/003; B62D 5/0481; B62D 5/0484; B62D 5/0487; B62D 6/002; B62D 6/003; B62D 9/005
USPC .................................. 701/41, 43, 72, 76, 78
See application file for complete search history.

(56) References Cited

U.S. PATENT DOCUMENTS

| | | | |
|---|---|---|---|
| 11,884,346 B2* | 1/2024 | Seiffer | B60K 17/356 |
| 2009/0093931 A1* | 4/2009 | Mizutani | B60K 7/0007 |
| | | | 701/41 |
| 2009/0133954 A1 | 5/2009 | Pohl | |
| 2010/0076650 A1* | 3/2010 | Spadafora | B62D 9/005 |
| | | | 701/43 |
| 2013/0253793 A1* | 9/2013 | Lee | B60W 50/029 |
| | | | 701/70 |
| 2015/0120144 A1 | 4/2015 | De Bruin et al. | |
| 2017/0120753 A1* | 5/2017 | Kentley | G05D 1/0088 |
| 2018/0273005 A1* | 9/2018 | Redder | B60T 8/885 |
| 2019/0039651 A1* | 2/2019 | Brok | B62D 6/00 |
| 2020/0047764 A1* | 2/2020 | Yamashita | B60W 30/18145 |
| 2021/0086737 A1* | 3/2021 | Schumann | B62D 7/228 |
| 2022/0055587 A1* | 2/2022 | Rapp | B62D 9/005 |
| 2022/0111892 A1* | 4/2022 | Seiffer | G07C 5/02 |

FOREIGN PATENT DOCUMENTS

| | | | | |
|---|---|---|---|---|
| DE | 196 32 251 A1 | 2/1998 | | |
| DE | 10 2006 028 957 A1 | 12/2007 | | |
| DE | 10 2012 211 901 A1 | 1/2014 | | |
| DE | 10 2013 011 883 A1 | 1/2015 | | |
| DE | 102014200608 A1 * | 7/2015 | ............ | B62D 9/002 |
| DE | 10 2018 212 804 A1 | 2/2020 | | |
| JP | H11334559 A | 12/1999 | | |
| JP | 2000190863 A | 7/2000 | | |
| JP | 2008087644 A | 4/2008 | | |
| JP | 2009248660 A | 10/2009 | | |

* cited by examiner

METHOD FOR CONTROLLING A MOTOR VEHICLE IN EMERGENCY STEERING MODE BY MEANS OF FRONT WHEEL BRAKE-BASED TORQUE VECTORING

CROSS REFERENCE TO RELATED APPLICATIONS

This application is a U.S. National Stage Entry of International Patent Application Serial Number PCT/EP2020/079545, filed Oct. 21, 2020, which claims priority to German Patent Application No. DE 10 2019 129 032.5, filed Oct. 28, 2019, the entire contents of both of which are incorporated herein by reference.

FIELD

The present disclosure generally relates to methods for controlling steer-by-wire steering systems for motor vehicles in emergency steering modes and to motor vehicles that are configured to carry such methods.

BACKGROUND

In steer-by-wire steering systems, the position of the steered wheels is not directly linked to the steering wheel. There is a connection between the steering wheel and the steered wheels via electrical signals. The driver's steering demand is picked up by a steering angle sensor, and the position of the steered wheels is controlled by means of a steering actuator in a manner dependent on the driver's steering demand. No mechanical connection to the wheels is provided.

In the normal mode, the controller operates the steer-by-wire steering system and constantly checks that the system components of the steering system are functioning properly. If a fault occurs, the function of the steer-by-wire steering system is deactivated. A mechanical fallback level may be provided, which allows an emergency steering mode. However, such mechanical fallback levels are expensive.

Thus a need exists for a method for controlling a steer-by-wire steering system for a motor vehicle that allows an emergency steering mode without a mechanical fallback level.

DETAILED DESCRIPTION

Figure 1:
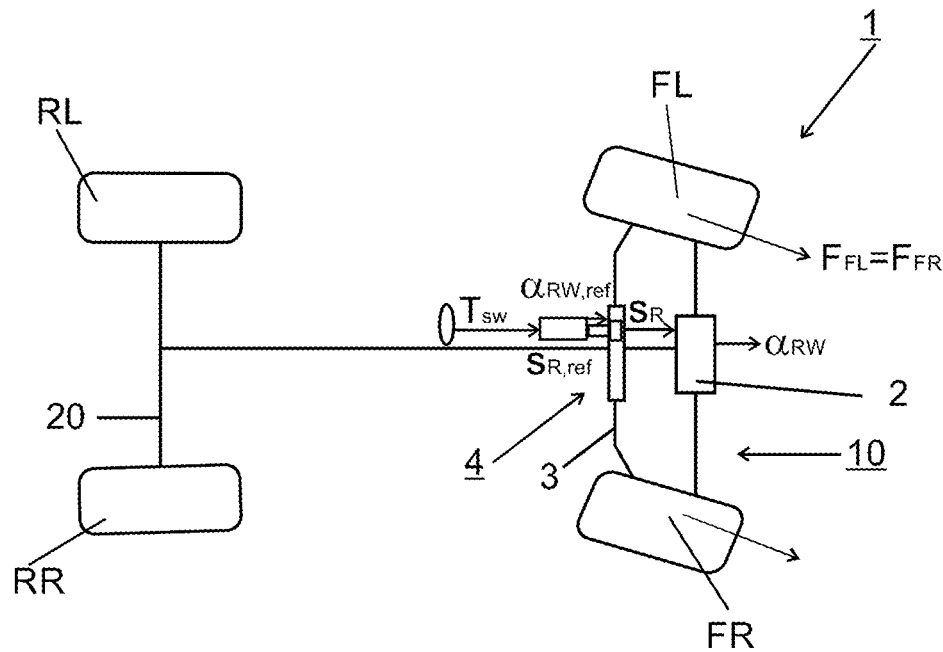
FIG. 1 is a schematic view of a motor vehicle with front-wheel drive having a single drive motor.

Although certain example methods and apparatuses have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Accordingly, a method for controlling a steer-by-wire steering system for a motor vehicle in an emergency steering mode is provided, wherein the motor vehicle comprises two axles each with two wheels, which are connected to one another via a steering tie rod of a steering system, wherein the front two wheels are steerable by means of a front-wheel steering system, and the motor vehicle comprises a single wheel drive which is assigned to one of the two axles and which drives the two wheels of the corresponding axle via a differential, wherein the wheel drive comprises a single actuator, and wherein the motor vehicle comprises a brake system, and the method comprises the following steps:

checking the steering system for the presence of a fault state, implementing the emergency steering mode in the event that a fault state has been detected, wherein the following steps are carried out in the emergency steering mode:

determining a setpoint position of the steering tie rod using a setpoint wheel steering angle, determining a front wheel to be braked and a brake pressure to attain the setpoint position by means of a control unit, transmitting the front wheel to be braked, and the brake pressure, to the brake system, and braking the front wheel to be braked, increasing a torque provided by the wheel drive in order to compensate for a loss of speed of the motor vehicle caused by the braking of the front wheel to be braked.

The brake-based torque vectoring allows the motor vehicle to be steered even in a fault state, in particular in the event of failure of the steering system, without the need for a mechanical fallback level.

The differential is a controllable differential. It is in particular an open or partially open differential.

A setpoint wheel steering angle is preferably determined for each of the vehicle wheels; the setpoint wheel steering angle of the left-hand and right-hand vehicle wheels may be identical or may form different angles.

The control unit for determining the front wheel to be braked and the brake pressure preferably comprises software for arbitration.

It is preferable if the chassis geometry, the properties of the brake system and the sign of the setpoint toothed rack position are input into the software in order to determine the front wheel to be braked and the brake pressure.

In one embodiment, the wheel drive is a rear-wheel drive which, in the emergency steering mode, provides the same additional torque for both rear wheels, such that the sum of the two additional torques compensates for the loss of speed.

Provision may also be made for the wheel drive to be a front-wheel drive with an open differential which, in the emergency steering mode, drives the unbraked front wheel, specifically with the sum of the torques of the two front wheels and with the additional torque for compensating for the loss of speed. The following relationship preferably applies for a right-hand bend: $T_{FL}+T_{FR}=2*T_{FL}+T_{ped,br}$, where $T_{FL}$ and $T_{FR}$ are the torque of the left-hand and right-hand front wheels and $T_{ped,br}$ is the braking torque introduced into the right-hand front wheel that is to be braked. The following relationship preferably applies for a left-hand bend: $T_{FL}+T_{FR}=2*T_{FR}+T_{ped,br}$, where $T_{ped,br}$ is the braking torque introduced into the left-hand front wheel that is to be braked.

Provision may very generally be made for the setpoint wheel steering angle to be determined using a steering torque that is introduced into a steering means by a driver, or to be specified by an autonomous or semi-autonomous driving mode.

The object is furthermore achieved by a motor vehicle that is configured to carry out the method described above. The motor vehicle preferably has a steering-head angle which is at a minimum and a scrub radius which at a maximum.

Preferred embodiments of the invention will be discussed in more detail below with reference to the drawing. Identical or functionally identical components are provided in this case with the same reference signs throughout the figures.

FIG. 1 schematically illustrates a motor vehicle 1 with two axles 10, 20 and four wheels FL, FR, RL, RR, wherein only the front wheels FL, FR are drivable (front-wheel drive) and the drive 2 of the front wheels FL, FR is arranged on a front axle 10. The drive 2 is an electric motor. The front axle 10 comprises, in relation to a direction of travel, a left-hand steerable front wheel FL and a right-hand steerable front wheel FR that are connected to one another via a toothed rack 3 of a rack-and-pinion steering gear 4. When the toothed rack 3 is displaced to the right or left transversely with respect to the direction of travel, the wheels FL, FR are pivoted about a respective pivot point.

The driver introduces a steering torque $T_{sw}$ into a steering means, in particular a steering wheel of a steer-by-wire steering system. A setpoint wheel steering angle of the steerable front wheels $\alpha_{RW,ref}$ and a setpoint toothed rack position $S_{R,ref}$ are determined from this steering torque $T_{sw}$. The toothed rack 3 is thereupon moved by means of the rack-and-pinion steering gear 4 until it reaches an actual toothed rack position $S_R$ and the wheels assume a wheel steering angle $\alpha_{RW}$.

When driving through a right-hand bend, as illustrated in FIG. 1, the drive torque is distributed uniformly to both front wheels FL,FR by means of the front-wheel drive, that is to say the traction force is the same for both front wheels, $F_{FL}=F_{FR}$.

Figure 2:
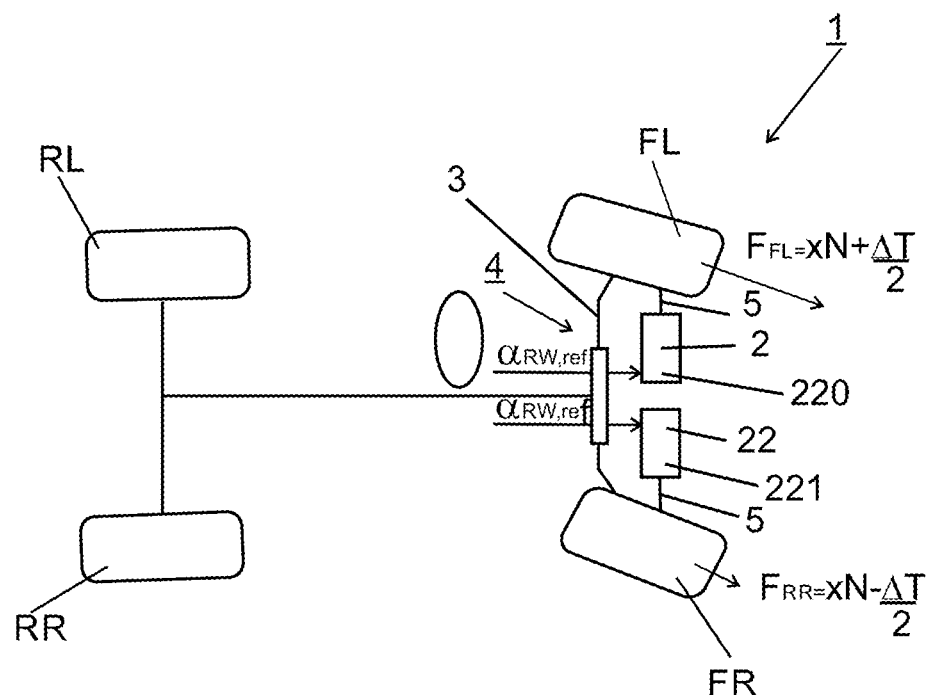
FIG. 2 is a schematic view of a motor vehicle with front-wheel drive having two drive motors.

FIG. 2 likewise shows a front-wheel drive known from the prior art, which has two separate actuators 2, 22. A left-hand wheel drive motor 220 is arranged on the left in the direction of travel, and a right-hand wheel drive motor 221 is arranged on the right in the direction of travel. The wheel drive motors 220, 221 are each connected via drive shafts 5 to the steerable front wheels FL,FR. The wheel drive motors 220, 221 are electric motors. The front wheels FL,FR of the front-wheel steering system are connected to one another via a toothed rack 3 of a rack-and-pinion steering gear 4. The rack-and-pinion steering gear 4 is controlled as in the case of the steer-by-wire steering system of FIG. 1, but the drive control is implemented such that a differential torque ΔT between the front wheels FL,FR is generated which is proportional to the setpoint wheel steering angle $\alpha_{RW,ref}$ of the steerable front wheels FL,FR or to the driver's steering demand. In other words, the setpoint wheel steering angle $\alpha_{RW,ref}$ of the steerable front wheels FL,FR is incorporated into the control of the front-wheel drive. When driving through a right-hand bend as illustrated in FIG. 2, the traction force for the left-hand front wheel is xN (for example 100N)+☐ΔT/2 and the traction force for the right-hand front wheel is xN-ΔT/2. The differential torque leads to a displacement of the toothed rack and thus to a steering operation.

Figure 3:
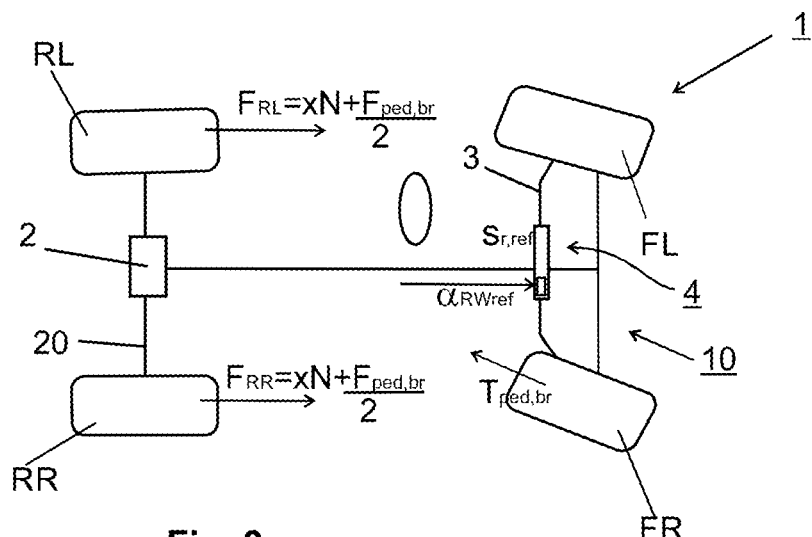
FIG. 3 is a schematic view of a motor vehicle with rear-wheel drive having one drive motor and front wheel brake-based torque vectoring.

FIG. 3 shows an exemplary embodiment of the invention. The motor vehicle 1 has a front-wheel steering system and a rear-wheel drive. The front wheels FL,FR of the front-wheel steering system are connected to one another via a toothed rack 3 of a rack-and-pinion steering gear 4. The rear-wheel drive has a single actuator 2, in particular an electric motor, which drives the rear wheels via a differential. In the event that the steer-by-wire steering system fails, that is to say the front-wheel steering system is no longer available, the motor vehicle switches to an emergency steering mode. In this emergency steering mode, the steering torque is provided by braking one of the front wheels FL,FR. A setpoint toothed rack position $S_{R,ref}$ is calculated in a manner dependent on the setpoint wheel steering angle $\alpha_{RW,ref}$. The toothed rack position is controlled by means of a controller that comprises software for arbitration. The chassis geometry, the properties of the brake system and the sign of the setpoint toothed rack position $S_{R,ref}$ are input into this software in order to determine a front wheel FR,FL to be braked and the brake pressure required for the braking operation. In order that the motor vehicle 1 does not lose speed as a result of the braking operation, the rear-wheel drive provides an additional torque at the rear wheels RR, RL, which additional torque corresponds to the traction force $F_{ped,br}$ and compensates for the loss of speed. A position of an accelerator pedal of the motor vehicle, preferably an accelerator pedal angle, and a position of a brake pedal, preferably a brake pedal angle, are transmitted to the controller in order to detect acceleration or deceleration of the motor vehicle and, from this, to calculate the additionally required torque.

FIG. 3 shows driving through a right-hand bend. The setpoint toothed rack position $S_{R,ref}$ and the setpoint wheel steering angle $\alpha_{Rw,ref}$ are also incorporated into the calculation of the braking torque $T_{ped,br}$ provided by the right-hand front wheel. A drive controller of the rear-wheel drive drives the right-hand rear wheel RR and left-hand rear wheel RL correspondingly, each of which imparts a traction force of xN (for example 100N)+$F_{ped,br}$/2, where $F_{ped,br}$ is the force that compensates for the braking torque $T_{ped,br}$.

In the emergency steering mode, the motor vehicle can be steered by way of front wheel brake-based torque vectoring, without drive-based torque vectoring, despite the fact that the drive comprises only a single electric motor. An additional mechanical fallback level can thus be omitted, whereby costs and weight can be saved.

Figure 4:
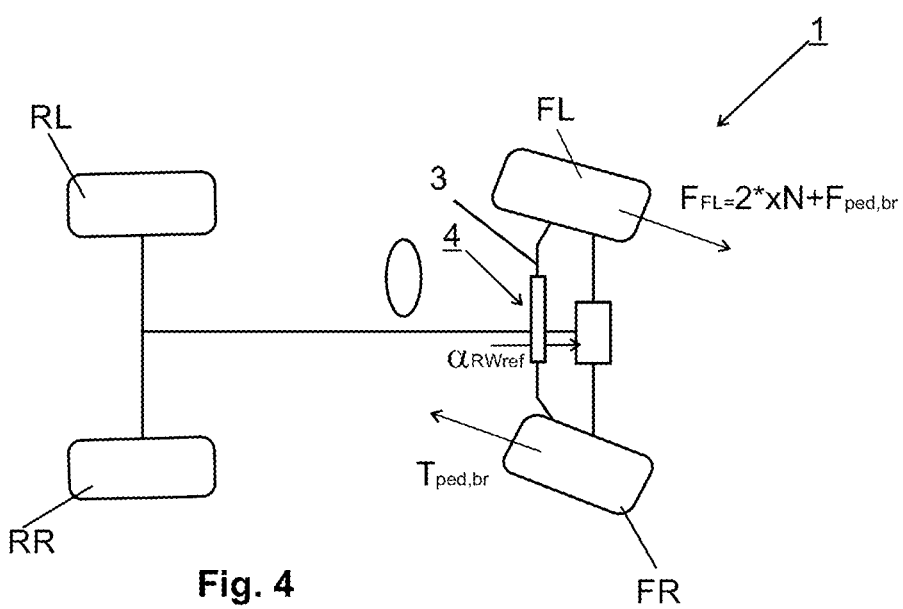
FIG. 4 is a schematic view of a motor vehicle with front-wheel drive having one drive motor and front wheel brake-based torque vectoring.

FIG. 4 illustrates a motor vehicle 1 with front-wheel drive and front-wheel steering system. The front wheels FL,FR of the front-wheel steering system are connected to one another via a toothed rack 3 of a rack-and-pinion steering gear 4. The front-wheel drive has a single actuator 2, in particular an electric motor, which drives the front wheels FL,FR via an open differential (without locking device) or a partially open differential. In the event that the steering system fails, that is to say the front-wheel steering system is no longer available, the motor vehicle 1 switches to an emergency steering mode. In this emergency steering mode, the steering torque is provided by braking one of the front wheels FL,FR. A setpoint toothed rack position $S_{R,ref}$ is calculated in a manner dependent on the setpoint wheel steering angle $\alpha_{RW,ref}$. The toothed rack position is controlled by means of a controller that comprises software for arbitration. The chassis geometry, the properties of the brake system and the sign of the setpoint toothed rack position $S_{R,ref}$ are input into this software in order to determine a front wheel to be braked and the brake pressure. In order that the motor vehicle 1 does not lose speed as a result of the braking operation, the actuator 2 of the front-wheel drive provides an additional torque that compensates for the loss of speed. A position of an accelerator pedal of the motor vehicle, preferably an accelerator pedal angle α, and a position of a brake pedal, preferably a brake pedal angle, are transmitted to the controller in order to detect acceleration or braking of the motor vehicle in order to calculate the additional torque.

The following relationship applies to the right-hand bend illustrated in FIG. 4:

$$T_{FL}+T_{FR}=2*T_{FL}+T_{ped,br},$$

where $T_{FL}$ and $T_{FR}$ are the torque of the left-hand and right-hand front wheels and $T_{ped,br}$ is the braking torque introduced into the front wheel FR to be braked.

In this case, the brake-based torque vectoring constitutes a particularly favorable and simple emergency steering mode, which allows the motor vehicle 1 to be steered after a failure of the steering system, without the need for a mechanical fallback level.

All embodiments preferably have in common the fact that a steering-head angle is at a minimum and a scrub radius is at a maximum, in order that a steering operation or a translation of the toothed rack can already be brought about by a small amount of brake pressure on the front wheel FL,FR to be braked.

A steering operation and/or emergency steering operation can be initiated both by a driver by turning a steering wheel, or moving some other steering means, and by a controller of an autonomous or semi-autonomous motor vehicle.

Figure 5:
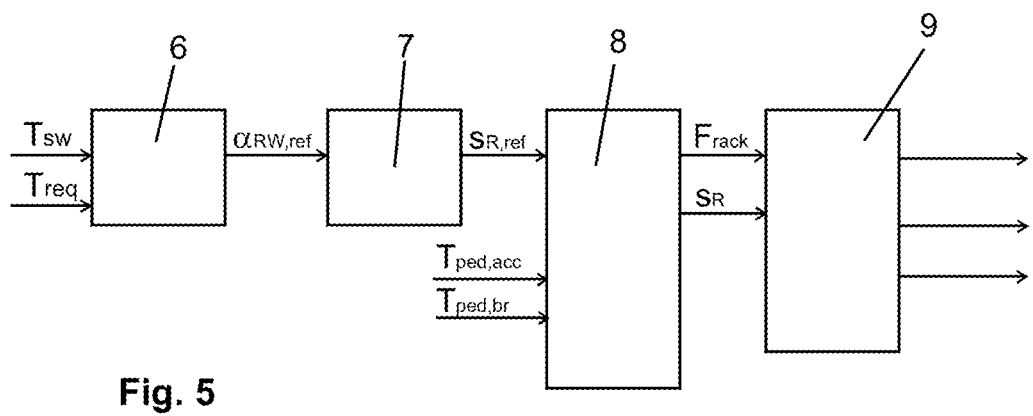
FIG. 5 is a block diagram of an example controller of a motor vehicle with front wheel brake-based torque vectoring.

FIG. 5 illustrates a block diagram of a controller of the motor vehicle with brake-based torque vectoring. In a first unit 6, the steering torque $T_{sw}$ introduced into a steering wheel by the driver, or a setpoint torque $T_{reg}$ demanded by an autonomous driving mode, are converted into a setpoint wheel steering angle $\alpha_{RW, ref}$ of the steerable front wheels FL,FR. A second unit 7 determines a setpoint toothed rack position $S_{R,ref}$ from the setpoint wheel steering angle $\alpha_{RW,ref}$. The actual toothed rack position $S_R$ and the toothed rack force $F_{Rack}$ are determined in a third unit 8 from the setpoint toothed rack position $S_{R,ref}$ and the braking torque $T_{ped,br}$ and the acceleration torque $T_{ped, acc}$ of the driven wheels. In a fourth unit 9, it is then determined from this how the motor vehicle and the vehicle wheels behave in the case of a constant speed and a cornering maneuver, acceleration and a cornering maneuver and during a braking operation in a cornering maneuver, with subsequent implementation for the respective vehicle state.

In the first state, the motor vehicle is driving at a constant speed v and along a bend or curved path. During the cornering maneuver, the setpoint toothed rack position $S_{R,ref}$ must, as a result of a steering wheel being turned or as a result of the front vehicle wheels being turned, assume a non-zero value because the toothed rack position changes or must change in the process. The braking force of the respective front vehicle wheels corresponds to the function of the setpoint toothed rack position $F_{FL}$, $F_{FR}$.=f($S_{R,ref}$). In this case, for the rear vehicle wheels, this means that the traction torque of the rear vehicle wheels $T_{FL}$, $T_{FR}$ is a function of the setpoint toothed rack position $S_{R,ref}$ and the acceleration torque $T_{ped,acc}$($T_{FL}$, $T_{FR}$.=f($S_{R,ref}$, $T_{ped,acc}$)) in order to maintain the vehicle speed.

In the second state, that is to say in the case of a tangential vehicle acceleration v>0 and during a cornering maneuver $S_{R,ref}\neq0$, the relationships relating to the braking force and the traction torque correspond to the 1st state: $F_{FL}$, $F_{FR}$.=f($S_{R,ref}$) and $T_{ped,acc}$ ($T_{FL}$, $T_{FR}$.=f($S_{R,ref}$, $T_{ped,acc}$)).

In the third state, which corresponds to a braking operation, that is to say when the vehicle speed is being reduced (v<0) and the vehicle is performing a cornering maneuver or driving on a curved path $S_{R,ref}\neq0$, the braking force of the front vehicle wheels is correspondingly a function of the setpoint toothed rack position and the braking torque $T_{ped,br}$ $F_{FL}$, $F_{FR}$.=f($S_{R,ref}$, $T_{ped,br}$)). The traction torque at the rear vehicle wheels is not present, and is therefore zero ($T_{FL}$, $T_{FR}$.=0).

What is claimed is:

1. A method for controlling a steer-by-wire steering system for a motor vehicle in an emergency steering mode, wherein the motor vehicle comprises two axles each with two wheels, wherein the two front wheels are steerable with a front-wheel steering system and are connected to one another via a steering tie rod of a steering system of the front-wheel steering system, wherein the motor vehicle comprises a single wheel drive that is assigned to one of the two axles and that drives the two wheels of the one axle via a differential, wherein the single wheel drive comprises a single actuator, wherein the motor vehicle comprises a brake system, the method comprising:
   checking the steering system for the presence of a fault state; and
   implementing an emergency steering mode upon detection of a fault state, wherein the following steps are performed in the emergency steering mode:
   determining a setpoint position of the steering tie rod using a setpoint wheel steering angle,
   determining a front wheel to be braked and a brake pressure to attain the setpoint position with a control unit,
   transmitting the front wheel to be braked and the brake pressure to the brake system,
   braking the front wheel to be braked, and
   increasing a torque provided by the single wheel drive to compensate for a loss of speed of the motor vehicle caused by the braking of the front wheel to be braked;
   wherein the single wheel drive is a front-wheel drive with an open differential, wherein the method comprises in the emergency steering mode driving with the front-wheel drive a non-braked front wheel such that a sum of torques of the two front wheels and the increased torque compensating for the loss of speed of the motor vehicle;
   wherein the following applies while the motor vehicle travels through a right-hand bend:

$$T_{FL}+T_{FR}=2*T_{FL}+T_{ped,br},$$

wherein $T_{FL}$ is a torque of a left-hand front wheel,
   wherein $T_{FR}$ is a torque of a right-hand front wheel,
   wherein $T_{ped,br}$ is a braking torque introduced into the front wheel to be braked.

2. The method of claim 1 comprising performing arbitration with software of the control unit.

3. The method of claim 1 wherein the control unit comprises software for arbitration.

4. The method of claim 3 wherein to determine the front wheel to be braked and the brake pressure, the method comprises incorporating into a calculation a chassis geometry, properties of the brake system, and a sign of the setpoint position.

5. The method of claim 1 wherein the single wheel drive is a rear-wheel drive, wherein the method comprises in the emergency steering mode providing with the rear-wheel drive a same additional torque to both of the rear wheels such that a sum of the additional torques compensates for the loss of speed of the motor vehicle.

6. The method of claim 1 comprising determining the setpoint wheel steering angle based on a steering torque that is introduced into a steering means by a driver.

7. The method of claim 6 comprising specifying the setpoint wheel steering angle by an autonomous or semi-autonomous driving mode.

8. The method of claim 1 comprising specifying the setpoint wheel steering angle by an autonomous or semi-autonomous driving mode.

9. A motor vehicle that is configured to perform the method of claim 1.

10. The motor vehicle of claim 9 wherein a steering-head angle is at a minimum and a scrub radius is at a maximum.

11. A motor vehicle, comprising:
  two axles each with two wheels, wherein two front wheels are steerable with a front-wheel steering system and are connected to one another via a steering tie rod of a steering system of the front-wheel steering system;
  a single wheel drive that is assigned to one of the two axles and that drives the two wheels of the one axle via a differential, wherein the single wheel drive comprises a single actuator; and
  a brake system;
  wherein a steering-head angle is at a minimum and a scrub radius is at a maximum;
  wherein the motor vehicle is configured to perform a method for controlling a steer-by-wire steering system in an emergency steering mode comprising:
    checking the steering system for the presence of a fault state; and
    implementing an emergency steering mode upon detection of a fault state, wherein the following are performed in the emergency steering mode:
    determining a setpoint position of the steering tie rod using a setpoint wheel steering angle,
    determining a front wheel to be braked and a brake pressure to attain the setpoint position with a control unit,
    transmitting the front wheel to be braked and the brake pressure to the brake system,
    braking the front wheel to be braked, and
    increasing a torque provided by the single wheel drive to compensate for a loss of speed of the motor vehicle caused by the braking of the front wheel to be braked.

* * * * *